March 21, 1950
C. S. ASH
2,501,018
VEHICLE WHEEL
Filed Nov. 1, 1945
4 Sheets-Sheet 4
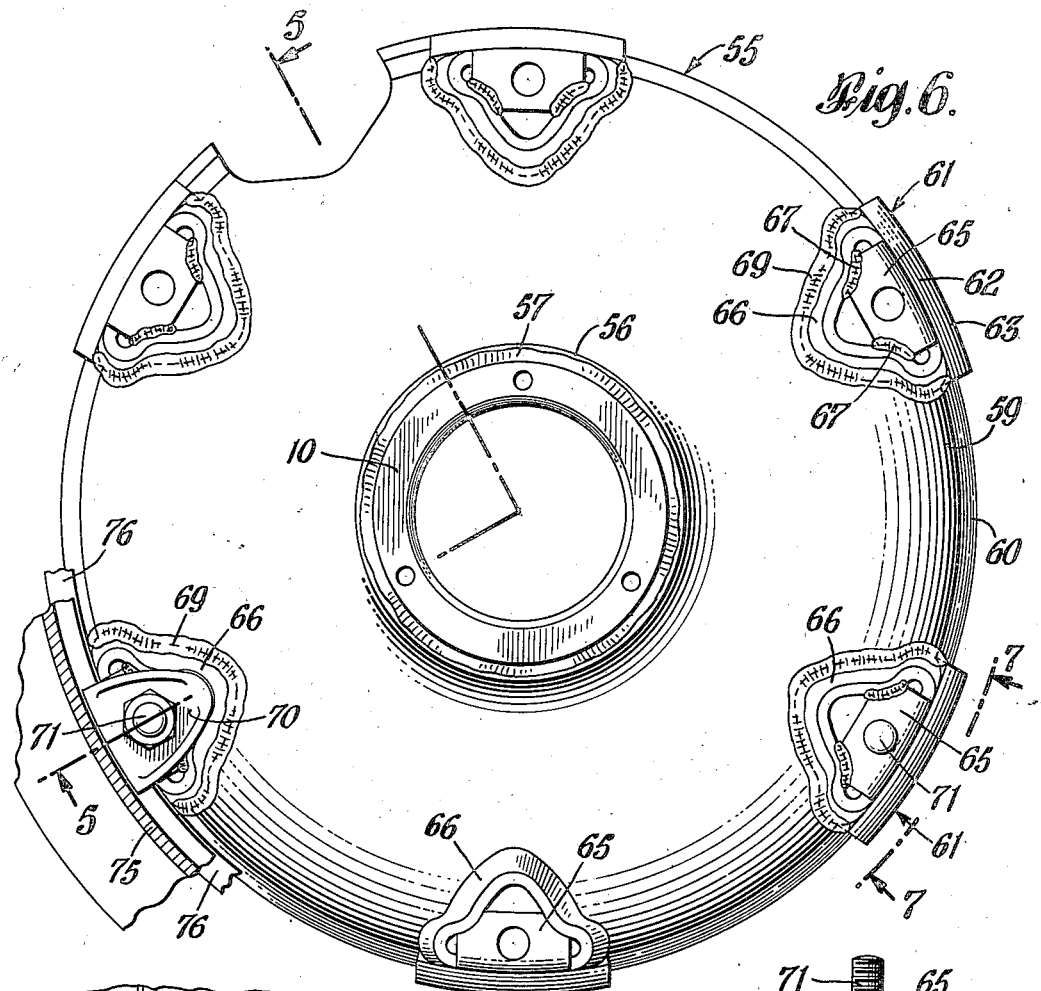
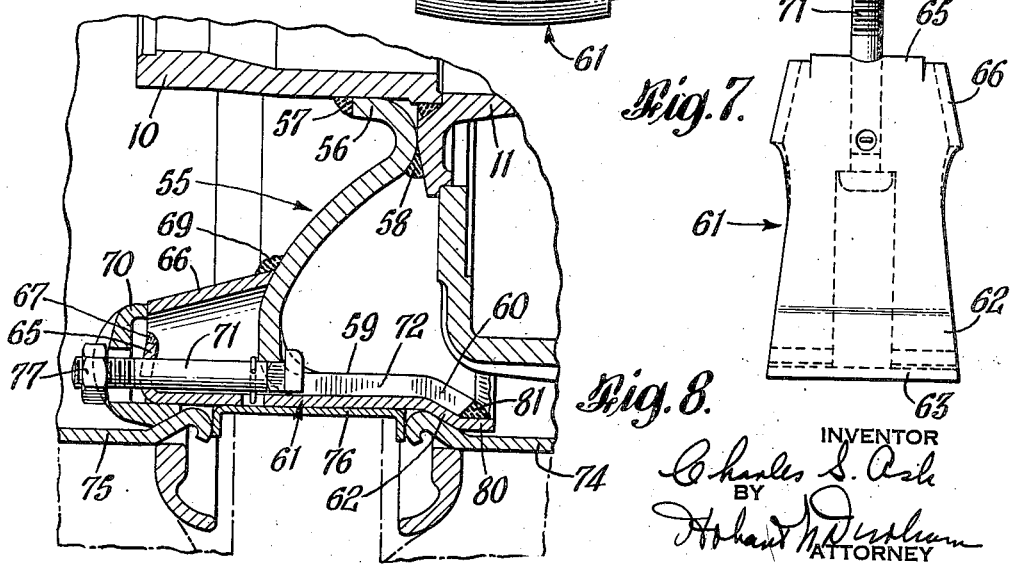
INVENTOR
Charles S. Ash
BY
ATTORNEY Patented Mar. 21, 1950

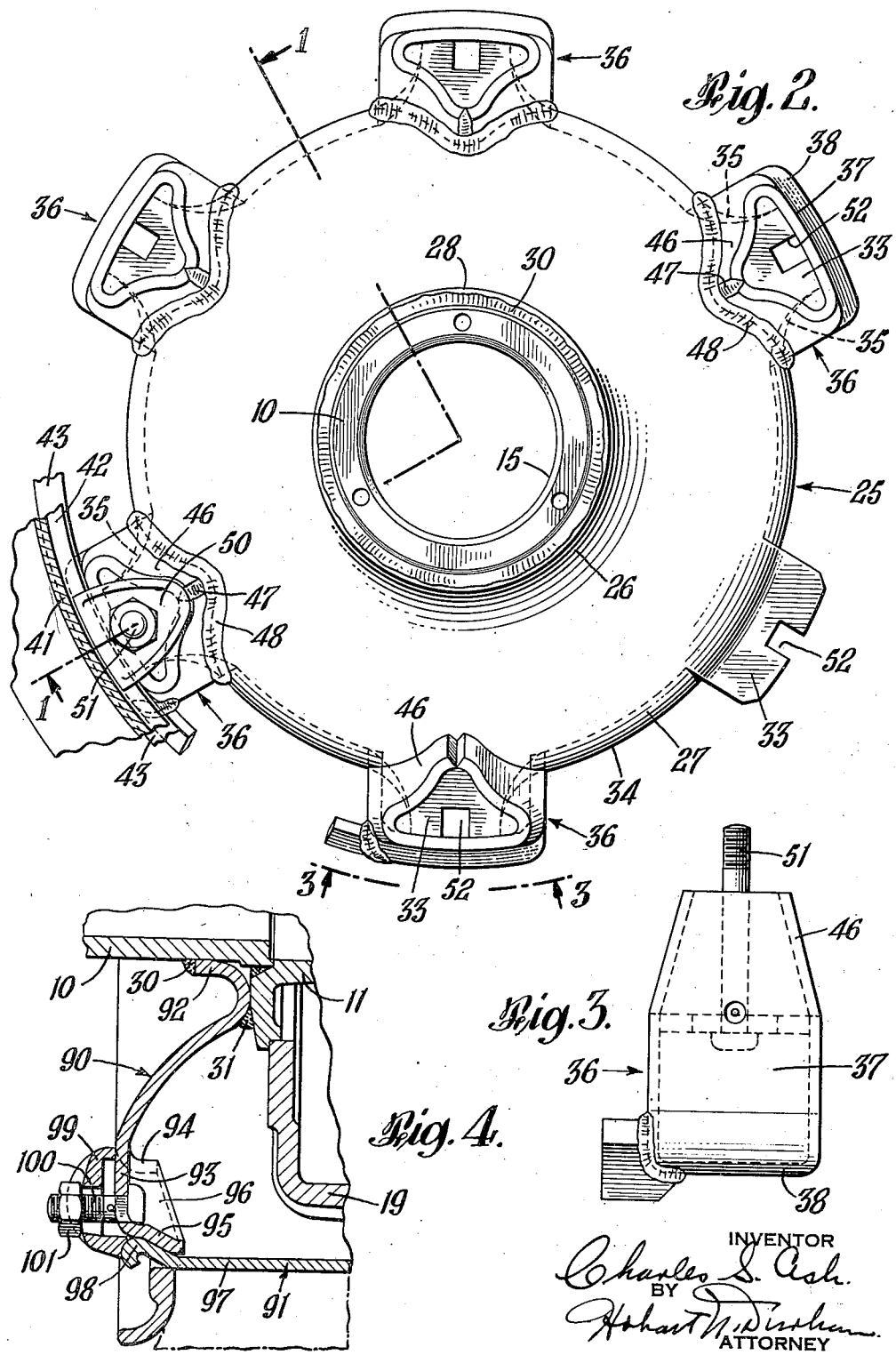

2,501,018

UNITED STATES PATENT OFFICE 2,501,018

VEHICLE WHEEL

Charles S. Ash, Milford, Mich.

Application November 1, 1945, Serial No. 626,026

16 Claims. (Cl. 301—13)

The present invention relates to vehicle wheels, and more particularly to vehicle wheels of the demountable rim type.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The present invention has for an object the provision of a vehicle wheel of the demountable rim type which is of relatively simple design and is easily and economically fabricated. Another object is the provision of a vehicle wheel such as that just mentioned which is of extremely strong and integral design and construction. The invention, in certain of its aspects, further provides a vehicle wheel designed to demountably mount a pair of tire rims for use on vehicles where dual wheel flotation has been found desirable, and the present invention is a stronger, lighter and more economical unit for use on such vehicles.

Of the drawings:

Fig. 2 is a side elevation of the vehicle wheel shown in Fig. 1 viewed from the outboard side of the wheel;

Fig. 3 is a plan view taken along line 3—3 of Fig. 2;

Fig. 4 is a fragmentary cross-sectional view of a modified embodiment of the present invention adapted to demountably mount a single tire rim;

Fig. 6 is a side elevation of the wheel shown in Fig. 5 viewed from the outboard side of the wheel;

Fig. 7 is a plan view taken along line 7—7 of Fig. 6; and

Fig. 8 is a fragmentary cross-sectional view of still another embodiment of the invention.

Figure 1:
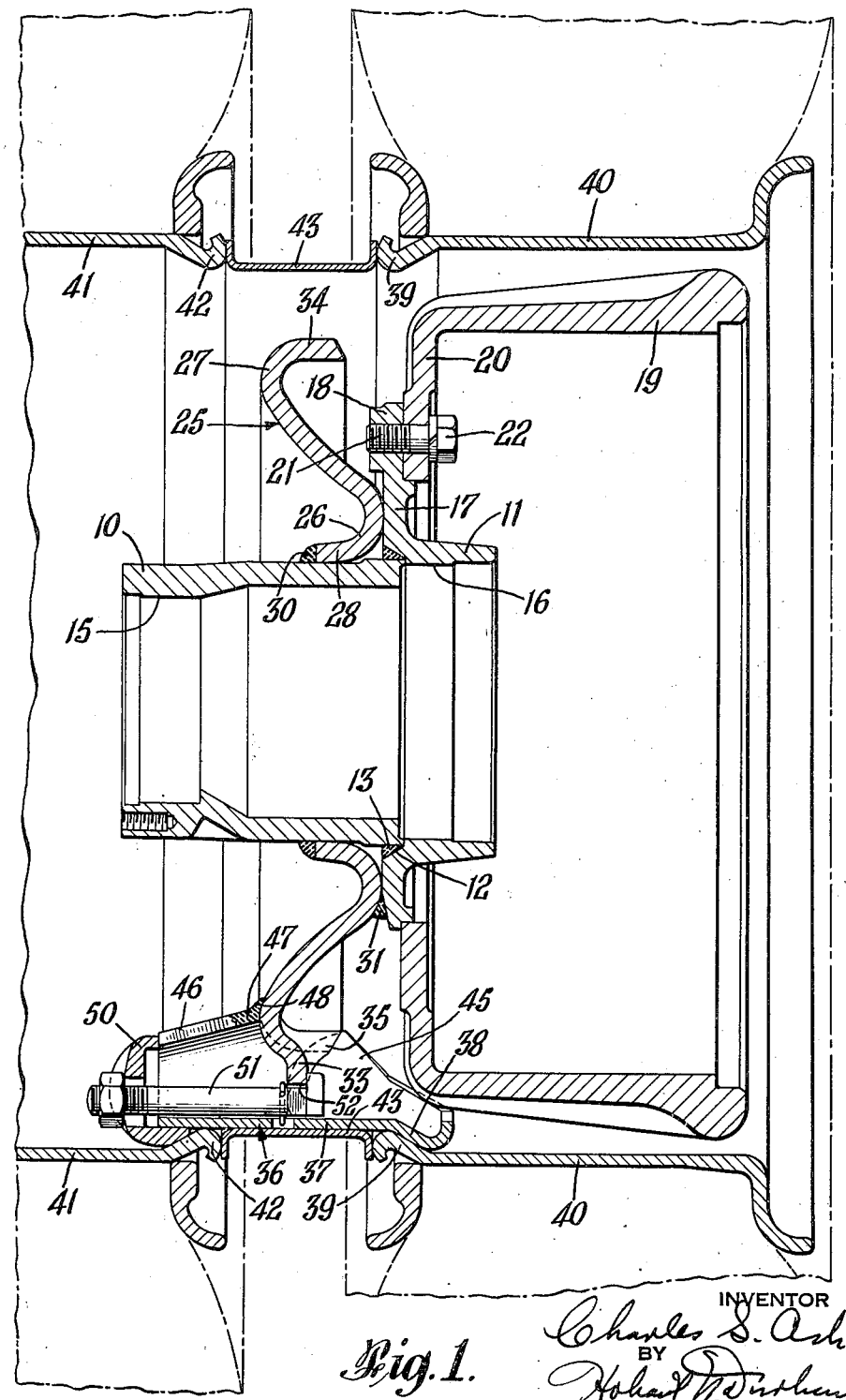
Fig. 1 is a cross-sectional view taken along line 1—1 of Fig. 2 showing a typical and illustrative embodiment of the present invention.

Referring now in detail to the several illustrative embodiments of the invention shown by way of example in the accompanying drawings, and referring first to the embodiment of Figs. 1 to 3 inclusive, a vehicle wheel for demountably mounting a pair of tire rims may comprise a composite, tubular hub including an outer substantially cylindrical hub portion 10 and an inner, shorter hub portion 11. The portions 10 and 11 are preferably separately cast and thereafter assembled by positioning an end of portion 10 in an end of the bore of portion 11 which has been frustoconically enlarged as indicated at 12 in Fig. 1, and the portions are securely joined by a circular weld 13. The hub portions 10 and 11 are internally finished as indicated by numerals 15 and 16 to receive suitable anti-friction bearings for freely rotatably mounting the wheel on an axle end.

As shown, the inner hub portion 11 is formed with an integral outwardly radially extending flange 17 at its outer end, which carries a plurality of radially extending lugs or extensions 18 to which a brake drum may be secured. Brake drum 19 may be of conventional design having inwardly extending flange or head 20 seated on hub flange 17 and against lugs 18, being secured thereto by tap bolts 21 and nuts 22.

Mounted on hub portion 10 centrally of the composite hub 10—11 is a single wheel web 25 of relatively heavy gauge. The web is preferably pressed into the strong and stable formation shown prior to its assembly on the hub, having an S-formation in radial cross-section providing inner and outer oppositely turned, radially extending annular curved portions or reaches 26 and 27, respectively, and an inner, peripheral cylindrical portion 28. The portion 28 is formed to receive hub 10—11 and curved portion 26 of the web abuts flange 17 of hub portion 11. A circular weld 30 securely joins web 25 and hub portion 10, and a plurality of spot welds 31 joins the web and hub portion 11, providing a strong, mutually reinforcing composite hub and web assembly with braking means.

Fig. 2 of the drawings shows the vehicle wheel in various stages of assembly for the reception of a pair of demountable tire rims, and discloses the outer peripheral formation of web 25 as including a plurality of outwardly radially extending integral spoke portions 33 and inwardly turned arcuate radially extending peripheral portions 34 between portions 33 and merging into them as indicated by numeral 35 said portions 34 being considered the outer peripheral, axially extending reach of the S-shaped web. Means for mounting rims on the wheel comprise a plurality of rim receiving plates and integral lug supports mounted on spoke portions 33 and welded to web 25, these plate and support members being numbered 36 in the drawings. As shown, each member 36 has a flat plate portion 37 which is positioned on a spoke portion 33 with the latter about midway of the length of the former. The axially inner end of each plate portion 37 is turned to provide an inclined portion 38 which is adapted to receive the turned annular edge or bead 39 of a conventional rim band 40 upon which the inner tire of the dual tires may be mounted. The outer rim 41, which is preferably a duplicate of rim 40 but oppositely positioned when mounted on the wheel, is seated on the external surfaces of plate portions 37 at its turned bead 42. Spacer ring 43 is also seated on the external surfaces of plate portions 37 between the edges 39 and 42 of the rims, providing for the secure assembly of the rims when the outer rim 41 is suitably secured, as will be explained.

The plate and lug supports 36 further comprise pairs of side webs 45 extending radially inwardly from the portions of the lateral edges of plate portions 37 behind spoke portions 33 of the wheel web, and these side webs 45 are formed to abut with their front edges the end surfaces of portion 34 and the merging portions 35 of web 25 between the spoke portions 33 and the turned portions 34 of the web. The plate and lug supports 36 are thus strongly mounted at their rear, or axially inward, extent on spoke portions 33.

A further integral part of each member 36 comprises web portions 46 extending radially inwardly from the lateral edges of the member forwardly of spoke portion 33. Each web portion 46 is reversely curved for strength, as shown, and curved toward the adjacent web of its respective member 36 so that the bottom edges of such webs 46 are brought adjacent to each other and abutting, as best shown at the bottom of Fig. 2 of the drawings. These abutting edges of webs 46 may be securely welded as indicated at 47, and the rear edges of the webs may be welded along a curved line, as indicated at 48, to the body of web 25 at the radially outer annular curved portion or reach 27 thereof. Each integral member 36 is thus stably mounted on and securely welded to web 25 over a spoke portion 33, and the axially outer edges of the various web portions 46 provide seats for lugs 50 which are used to engage the outer rim 41 along an inclined surface of its bead 42. Lug mounting bolts 51 are positioned through squared apertures 52 in spoke portions 33, and extend outwardly to receive the lugs 50.

Figure 5:
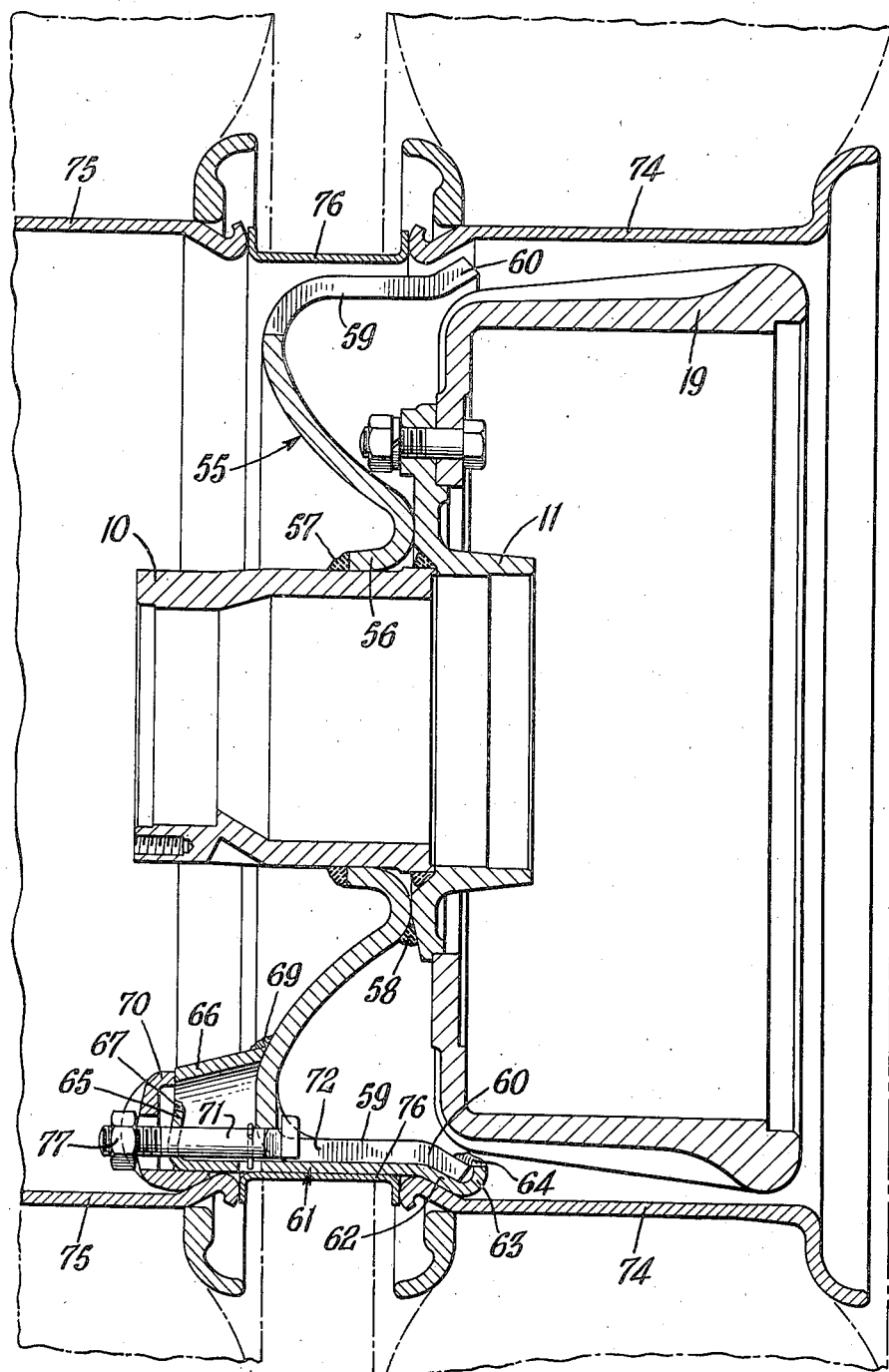
Fig. 5 is a cross-sectional view taken along line 5—5 of Fig. 6 showing a further embodiment of the present invention.

Referring now to the illustrative embodiment of the invention shown in Figs. 5 to 7 inclusive of the drawings, it will be noted that there is again provided a hub assembly 10—11 with brake drum 19 similar to the embodiment of Figs. 1, 2 and 3 just described. The web 55 in this embodiment of the invention is similarly pressed to have a substantially S-shape in radial cross-section and is provided with an internal peripheral cylindrical portion 56 to be welded at 57 and 58 to the hub 10—11.

At its outer periphery web 55 terminates in an axially extending cylindrical peripheral portion or reach 59 of substantial length and the axially inner or open end of portion 59 is radially outwardly turned as indicated at 60. Means for mounting dual rims on the wheel comprise a plurality of axially extending, circumferentially spaced plate members 61 on the outer surface of cylindrical portion 59 of web 55, having axially inner inclined portions 62 conforming to portion 60 and, further axially inwardly, ends 63 turned over the edge or end of portion 59 and welded thereto as at 64.

Plates 61 extend axially outwardly beyond cylindrical portion 59 of the wheel web and have radially inwardly turned ends 65 shaped to abut the walls of lug supporting members 66, being welded thereto at 67. The lug supporting members 66 comprise single curved webs of material formed as shown in Fig. 6 to surround the turned webs 65 of plates 61, abutting at their rear edges the outermost radially extending curved portion or reach of web 55 and welded thereto at 69, and providing with their front edges seats for rim mounting lugs 70. Lug bolts 71 extend through suitable apertures in web 55 and turned portions 65 of plate 61, and slots 72 are provided at intervals in cylindrical portion 59 to accommodate the bolts.

The inner rim 74 is seated against inclined portions 62 of plates 61, the outer rim 75 is received on the upper surfaces of plates 61, and spacer ring 76, lugs 70 and nuts 77 maintain the rims in assembled position.

In Fig. 8 of the drawings there is shown a modification of the embodiment of Figs. 5, 6 and 7, just described, wherein the axially inner ends 80 of plates 61 are not turned but are economically left straight, and welded at 81 to the edge or end of axially extending cylindrical peripheral portion or reach 59 of web 55.

In the embodiment of the invention shown in Fig. 4 of the drawings the hub structure 10—11 with brake drum 19, identical with the structure for the embodiments of the invention already described, is utilized with a web 90 adapted to mount a single tire rim 91. As shown, the web 90 is provided with an inner peripheral cylindrical portion 92 which seats on the hub and is reversely turned therefrom to curve to a substantial extent axially outwardly. At its outer periphery web 90 has a plurality of circumferentially spaced, outwardly radially extending spoke portions 93, and between the spokes the web is inwardly turned as indicated at 94. Spokes 93 are also inwardly turned at their ends providing inclined portions 95, and the turned portions 94 and 95 are joined by webs or walls 96 to provide spoke ends of great strength for the web 90. Rim band 97 is mounted with its edge 98 seated on inclined portion 95, and lugs 99 seated on plane spoke portions 93 cooperate with bolts 100 and nuts 101 to hold the rim in mounted position.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel comprising, in combination, a radially extending web member of substantially S configuration in radial cross section and means for mounting a pair of tire rims on said member, said means comprising a plurality of circumferentially spaced, axially extending plate elements on the outer periphery of said member supported against the outer radially extending curved reach and at the end of the outer axially extending reach of said member, each said element having surfaces to receive a pair of tire rims.

2. A vehicle wheel comprising, in combination, a radially extending web member and means for mounting a pair of tire rims on said member, said means comprising a plurality of circumferentially spaced, axially extending plate elements on the outer periphery of said member, each said element having an inclined radially outer surface and a flat radially outer surface to receive respective ones of a pair of tire rims.

3. A vehicle wheel comprising, in combination, a radially extending web member of substantially S configuration in radial cross section and means for mounting a pair of tire rims on said member, said means comprising a plurality of circumferentially spaced, axially extending plate elements supported on the outer axially extending periphery of said member, each said element having surfaces to receive a pair of tire rims.

4. A vehicle wheel comprising, in combination, a radially extending web member and means for demountably mounting a pair of tire rims on said web member, said means comprising a plurality of circumferentially spaced, axially extending plate elements on the outer periphery of said web member, each said element having surfaces to receive a pair of tire rims, and a lug supporting member secured to said web member and extending axially outwardly therefrom beneath a portion of each said element said lug supporting members having seats at their axially outer edges to receive a rim lug.

5. A vehicle wheel comprising, in combination, a radially extending web member and means for mounting a pair of tire rims on said web member, said means comprising a plurality of circumferentially spaced, axially extending plate elements on the outer periphery of said web member each said element having inwardly radially extending web portions abutting said web member radially inwardly of the outer periphery thereof and having radially outer surfaces to receive a pair of tire rims.

6. A vehicle wheel comprising, in combination, a radially extending web member and means for mounting a pair of tire rims on said web member, said means comprising a plurality of circumferentially spaced, axially extending plate elements on the outer periphery of said web member each said element having an inwardly radially extending web portion on either side axially of the periphery of said web member abutting said web member radially inwardly of the outer periphery thereof and having radially outer surfaces to receive a pair of tire rims.

7. A vehicle wheel comprising, in combination, a radially extending web member and means for mounting a pair of tire rims on said member, said means comprising a plurality of circumferentially spaced, axially extending plate elements on the outer periphery of said web member each said element having an inwardly radially extending web portion on either side axially of the periphery of said web member abutting said web member radially inwardly of the outer periphery thereof, the axially outer said web portion of each said element having a seat on the axially outer edge thereof to receive a rim lug, said elements having radially outer surfaces to receive a pair of tire rims.

8. A vehicle wheel comprising, in combination, a radially extending web member and means for mounting a pair of tire rims on said web member, said means comprising a plurality of circumferentially spaced, axially extending plate elements on the outer periphery of said web member each said element having an inwardly radially extending web portion on each lateral edge thereof on either side axially of the periphery of said web member said web portions abutting said web member radially inwardly of the periphery thereof, the pair of web portions of each said element axially outwardly of said web being curved toward each other and abutting at their lower edges and having seats at their axially outer edges to receive a rim lug, said elements having radially outer surfaces to receive a pair of tire rims.

9. A vehicle wheel comprising, in combination, a radially extending web member having a plurality of outwardly radially extending, circumferentially spaced, plane, integral spoke members on the outer periphery thereof, said periphery between said spoke members being axially inwardly turned, and means for mounting a pair of tire rims on said web member, said means comprising an axially extending plate element on each said spoke member each said plate member having radially outer surfaces to receive a pair of tire rims.

10. A vehicle wheel comprising, in combination, a radially extending web member having an axially extending integral cylindrical portion at the outer periphery thereof, and means for mounting a pair of tire rims on said web member, said means comprising a plurality of axially extending, circumferentially spaced plate elements on said cylindrical portion said elements having radially outer surfaces to receive a pair of tire rims.

11. A vehicle wheel comprising, in combination, a radially extending web member having an axially extending integral cylindrical portion at the outer periphery thereof, and means for demountably mounting a pair of tire rims on said web member, said means comprising a plurality of axially extending, circumferentially spaced plate elements on said cylindrical portion extending axially outwardly beyond said portion, and a lug supporting member extending axially outwardly from said web member beneath each said plate element having seats on the axially outer edges thereof to receive a rim lug, said plate elements having radially outer surfaces to receive a pair of tire rims.

12. A vehicle wheel comprising, in combination, a radially extending web member having an axially extending integral cylindrical portion at the outer periphery thereof, and means for demountably mounting a pair of tire rims on said web member, said means comprising a plurality of axially extending, circumferentially spaced plate elements on said cylindrical portion extending axially outwardly beyond said portion and having radially inwardly turned ends, and a lug supporting member comprising a curved web secured to said web member and extending axially outwardly therefrom beneath each said plate element and secured to a said radially inwardly turned end of a said plate element, said curved webs providing seats at their axially outer edges for rim lugs, said plate elements having radially outer surfaces to receive a pair of tire rims.

13. A vehicle wheel comprising, in combination, a radially extending web member having an axially inwardly turned integral cylindrical portion at the outer periphery thereof said portion being outwardly radially flared at its axially inner edge, and means for mounting a pair of tire rims on said web member, said means comprising a plurality of axially extending, circumferentially spaced plate elements on said cylindrical portion having inclined axially inner ends conforming to the flared edge of said cylindrical portion said axially inner ends of said elements being radially inwardly turned over the edge of said cylindrical portion and secured thereto, said inclined axially inner end of each said plate element serving as a seat for a tire rim, said plate elements having other radially outer surfaces to receive another tire rim.

14. A vehicle wheel comprising, in combination, a radially extending web member having an axially inwardly turned integral cylindrical portion at the outer periphery thereof said portion being outwardly radially flared at its axially inner edge, and means for mounting a pair of tire rims on said web member, said means comprising a plurality of axially extending, circumferentially spaced plate elements on said cylindrical portion having inclined axially inner ends conforming to the flared edge of said cylindrical portion said axially inner ends extending axially inwardly beyond the edge of said cylindrical portion and being welded thereto, said inclined axially inner end of each said plate element serving as a seat for a tire rim, said plate elements having other radially outer surfaces to receive another tire rim.

15. A vehicle wheel comprising, in combination, a composite hub formed by a pair of tubular hub elements one of said elements having a frusto-conical mouth at one end of the bore thereof and an integral brake drum flange secured to said end and extending radially outwardly of said one element having a substantially plane radial surface adjacent said mouth, said other element having an end positioned in said frusto-conical mouth said elements being secured together by welding in said mouth between the bore of said one element and the external surface of said other element, said other element having a substantially cylindrical exterior surface adjacent said end in said mouth, a single pressed, radially extending web of substantially S configuration in radial cross section having a substantially cylindrical portion at the inner periphery thereof seated on said cylindrical exterior surface and welded thereto the lower curved portion of said web immediately radially outwardly of said cylindrical portion abutting said plane radial surface of said flange and welded thereto, and means for demountably mounting a rim on the outer periphery of said web member.

16. A vehicle wheel comprising, in combination, a composite hub formed by a pair of tubular hub elements one of said elements having a frusto-conical mouth at one end of the bore thereof and an integral brake drum flange secured to said end and extending radially outwardly of said one element having a substantially plane radial surface adjacent said mouth, said other element having an end positioned in said frusto-conical mouth, said elements being secured together by welding in said mouth between the bore of said one element and the external surface of said other element, said other element having a substantially cylindrical exterior surface adjacent said end in said mouth, a single pressed, radially extending web of substantially S configuration in radial cross section having a substantially cylindrical portion at the inner periphery thereof seated on said cylindrical exterior surface and welded thereto the lower curved portion of said web immediately radially outwardly of said cylindrical portion abutting said plane radial surface of said flange and welded thereto, and means for mounting a pair of tire rims on said web said means comprising a plurality of circumferentially spaced, axially extending plate elements on the outer periphery of said web, each said plate element having an inclined radially outer surface and a flat radially outer surface to receive respective ones of a pair of tire rims.

CHARLES S. ASH.

REFERENCES CITED

The following references are of record in the file of this patent:

UNITED STATES PATENTS

| Number | Name | Date |
|---|---|---|
| 1,533,438 | Main | Apr. 14, 1925 |
| 1,559,538 | Alderfer | Nov. 3, 1925 |
| 1,895,499 | Stough | Jan. 31, 1933 |
| 1,985,054 | Nelson | Dec. 18, 1934 |
| 2,002,290 | Krieg | May 21, 1935 |
| 2,287,009 | Alden | June 23, 1942 |